US012046114B2

(12) United States Patent
Chu et al.

(10) Patent No.: US 12,046,114 B2
(45) Date of Patent: Jul. 23, 2024

(54) SMOKE DETECTION DEVICE WITH PREFERRED DETECTION ACCURACY

(71) Applicant: PixArt Imaging Inc., Hsin-Chu (TW)

(72) Inventors: Yen-Chang Chu, Hsin-Chu (TW); Yen-Po Chen, Hsin-Chu (TW); Chih-Ming Sun, Hsin-Chu (TW); Cheng-Nan Tsai, Hsin-Chu (TW); Ching-Kun Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 241 days.

(21) Appl. No.: 17/741,459

(22) Filed: May 11, 2022

(65) Prior Publication Data

US 2023/0252871 A1 Aug. 10, 2023

(30) Foreign Application Priority Data

Feb. 7, 2022 (TW) ................................ 111201312
Mar. 3, 2022 (TW) ................................ 111202115

(51) Int. Cl.
*G08B 17/10* (2006.01)
*G08B 17/107* (2006.01)

(52) U.S. Cl.
CPC .................................. *G08B 17/107* (2013.01)

(58) Field of Classification Search
CPC .................................................... G08B 17/107
See application file for complete search history.

(56) References Cited

U.S. PATENT DOCUMENTS 5,400,014 A * 3/1995 Behlke ................. G08B 17/107 340/630
5,546,074 A * 8/1996 Bernal ................. G08B 17/107 340/630
5,721,529 A * 2/1998 Vane ...................... G08B 29/26 340/514
5,793,295 A * 8/1998 Goldstein ............ G08B 17/103 340/630
7,733,234 B2 * 6/2010 Montgomery ......... G08B 17/12 340/584
2006/0007009 A1 * 1/2006 Hess .................... G08B 17/113 340/628
2006/0017580 A1 * 1/2006 Hess .................... G08B 17/113 340/630
2009/0051552 A1 * 2/2009 Chabanis ............. G08B 17/107 340/584
2012/0268281 A1 * 10/2012 Hojmose .............. G08B 17/113 340/630
2013/0286393 A1 * 10/2013 Erdtmann ............ G08B 17/107 250/338.5
2017/0162019 A1 * 6/2017 Cruse ..................... G02B 5/003
2022/0165141 A1 * 5/2022 Tsai ....................... G08B 29/26

* cited by examiner

*Primary Examiner* — Travis R Hunnings
(74) *Attorney, Agent, or Firm* — Winston Hsu

(57) ABSTRACT

A smoke detection device includes a housing, a smoke collector, an optical detector and a cover plate. The housing has a piercing hole. The smoker collector has a smoke hole, and position of the smoke hole is close to position of the piercing hole. The optical detector is disposed inside the smoke collector and adapted to detect gaseous concentration inside the smoke collector. The cover plate is disposed between the housing and the smoke collector, and used to set a channel from the piercing hole to the smoke hole, so that gaseous matter flows from outside the smoke detection device into the smoke collector through the piercing hole and the smoke hole.

13 Claims, 5 Drawing Sheets

SMOKE DETECTION DEVICE WITH PREFERRED DETECTION ACCURACY

BACKGROUND OF THE INVENTION

1. Field of the Invention

The present invention relates to a smoke detection device, and more particularly, to a smoke detection device with preferred detection accuracy.

2. Description of the Prior Art

A smoke detection device is an alarm device widely applied to home security protection. The conventional smoke detection device can include an ionization smoke detection device and a photoelectric smoke detection device. The ionization smoke detection device detects small amounts of radioactive material in the air, which create the current between a pair of electrodes. When smoke flows into the smoke collecting box of the ionization smoke detection device, the current between the electrodes is decreased due to the smoke, and the alarm can be output when the decreased current reaches a predetermined threshold. The photoelectric smoke detection device is equipped with a light transmitter and a light receiver in the smoke collecting box. When the smoke flows into the smoke collecting box, the light receiving amount of the light receiver is reduced, and the alarm can be output when the decreasing range of the light receiving amount reaches the predetermined threshold. However, if the smoke generated by the fire accident flows into the smoke collecting box, the high temperature smoke will increase the overall temperature of the smoke detection device. In order to keep pressure balance between the inside and outside of the smoke collecting box, the low-concentration smoke can only flow around the light receiver heated by the high temperature, which makes the smoke concentration detection of the photoelectric smoke detection device inaccurate. Thus, design of a smoke detection device capable of calibrating the detection inaccuracy affected by the high temperature environment around the smoke detection device is an important issue in the related fire equipment industry.

SUMMARY OF THE INVENTION

The present invention provides a smoke detection device with preferred detection accuracy for solving above drawbacks.

According to the claimed invention, a smoke detection device smoke detection device includes a housing, a smoke collector, an optical detector and a cover plate. The housing has a piercing hole. The smoker collector has a smoke hole, and position of the smoke hole is close to position of the piercing hole. The optical detector is disposed inside the smoke collector and adapted to detect gaseous concentration inside the smoke collector. The cover plate is disposed between the housing and the smoke collector, and used to set a channel from the piercing hole to the smoke hole, so that gaseous matter flows from outside the smoke detection device into the smoke collector through the piercing hole and the smoke hole.

According to the claimed invention, the housing includes a first section and a second section, the piercing hole is formed on the second section, and the cover plate is disposed on a boundary set between the first section and the second section. The smoke collector is disposed inside the first section and partly stretched into the second section, and the smoke hole is formed on a wall of the smoke collector stretched into the second section.

According to the claimed invention, a gap between the housing and the smoke collector is sealed by the cover plate, so as to prevent the gaseous matter entering the piercing hole from flowing from the second section to the first section. Two opposite ends of the cover plate are respectively attached to the housing and the smoke collector via adhesive.

According to the claimed invention, an installation hole and an exhausting hole are formed on the first section, the exhausting hole is adjacent to an attached surface of the housing, and the attached surface is an outer surface of the smoke detection device contacting a ceiling. The housing further has a guiding element disposed between the installation hole and the exhausting hole, and adapted to guide the gaseous matter entering the installation hole to exhaust out of the housing through the exhausting hole.

According to the claimed invention, the housing further has a heat dissipation element disposed inside the first section and adapted to absorb heat transmitted into the housing by the gaseous matter. The heat dissipation element is disposed inside the housing, or a part of the heat dissipation element is stuck out of the housing for heat dissipation.

According to the claimed invention, a smoke detection device includes a housing, a smoke collector and an optical detector. The housing has a piercing hole, an installation hole and an exhausting hole. The exhausting hole is adjacent to an attached surface of the housing, and the attached surface is an outer surface of the smoke detection device contacting a ceiling. The smoke collector has a smoke hole, and position of the smoke hole is close to position of the piercing hole. The optical detector is disposed inside the smoke collector and adapted to detect gaseous concentration inside the smoke collector. Gaseous matter flowing into the housing through at least one of the piercing hole and the installation hole but not entering the smoke collector through the smoke hole is exhausted out of the housing via the exhausting hole.

According to the claimed invention, the housing further has a guiding element disposed between the installation hole and the exhausting hole, and adapted to establish a channel from the installation hole to the exhausting hole. The housing includes a first section and a second section, the installation hole and are exhausting hole are formed on the first section, the piercing hole is formed on the second section.

According to the claimed invention, the guiding element is made by thermal conductivity material adapted to absorb heat transmitted into the housing by the gaseous matter. The guiding element is disposed inside the housing, or a part of the heat dissipation element is stuck out of the housing for heat dissipation.

According to the claimed invention, a smoke detection device includes a housing, a smoke collector, an optical detector and a heat dissipation element. The housing has a piercing hole. The smoke collector has a smoke hole, and position of the smoke hole is close to position of the piercing hole. The optical detector is disposed inside the smoke collector and adapted to detect gaseous concentration inside the smoke collector. The heat dissipation element is disposed inside the housing and adapted to absorb heat transmitted into the housing by the gaseous matter flowing through the piercing hole and the smoke hole.

According to the claimed invention, the heat dissipation element is disposed inside the housing, or a part of the heat dissipation element is stuck out of the housing for heat dissipation. The housing includes a first section and a second section, the smoke collector is disposed inside the first section and partly stretched into the second section, the heat dissipation element is disposed on the first section, and the piercing hole is formed on the second section.

According to the claimed invention, a smoke detection device is matched with a first oscillator, and the first oscillator has a first oscillating parameter. The smoke detection device includes an optical detector, a second oscillator and an operation processor. The optical detector detects smoke concentration. The second oscillator is electrically connected to the optical detector and has a second oscillating parameter, and drives the optical detector to detect the smoke concentration. The operation processor is electrically connected to the optical detector and the second oscillator. The operation processor analyzes parameter difference between the first oscillating parameter and the second oscillating parameter to calibrate a detection result of the smoke concentration detected by the optical detector.

The gaseous concentration passing through the smoke detection device is affected by the temperature of the smoke detection device. If the smoke detection device has high temperature, the gaseous concentration flowing around the smoke detection device is lowered, and the alarm of the smoke detection device is triggered until the gaseous concentration exceeds a higher threshold; the smoke detection device may not immediately output the alarm if the gaseous matter is fire smoke. Therefore, the present invention can optionally apply one or some of the cover plate, the exhausting hole, the guiding element and the heat dissipation element for the smoke detection device, so as to effectively cool down the temperature of the smoke detection device and increase the detection accuracy of the smoke detection device.

The present invention can acquire the environmental temperature without additional temperature sensor, and can effectively decrease hardware cost and systematic complexity of the smoke detection device; the increased second oscillation parameter can represent the environmental temperature is raised, and the decreased second oscillation parameter can represent the environmental temperature is dropped, so that the parameter difference between the first oscillation parameter and the second oscillation parameter can be analyzed to estimate the actual environmental temperature around the smoke detection device. The present invention can analyze information of the environmental temperature to determine that the intensity variation of the optical reflection signal received by the optical detector is resulted from the fire smoke or other interference. Besides, the present invention can utilize the external first oscillator to calibrate a detection error of the second oscillator affected by the changed environmental temperature. The first oscillator can be a variety of oscillators. The oscillator that has the oscillation parameter varied smaller than variation of the oscillation parameter of the second oscillator inside the smoke detection device in accordance with temperature change can conform to a scope of the first oscillator in the present invention. The smoke detection device of the present invention can compute the parameter difference between the first oscillation parameter and the second oscillation parameter, and adjust a comparison result between the intensity variation of the optical reflection signal and the threshold in accordance with the parameter difference, so as to avoid the smoke detection device from early outputting the alarm in response to the low smoke concentration, or to avoid the smoke detection device from delaying the alarm in response to the high smoke concentration.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
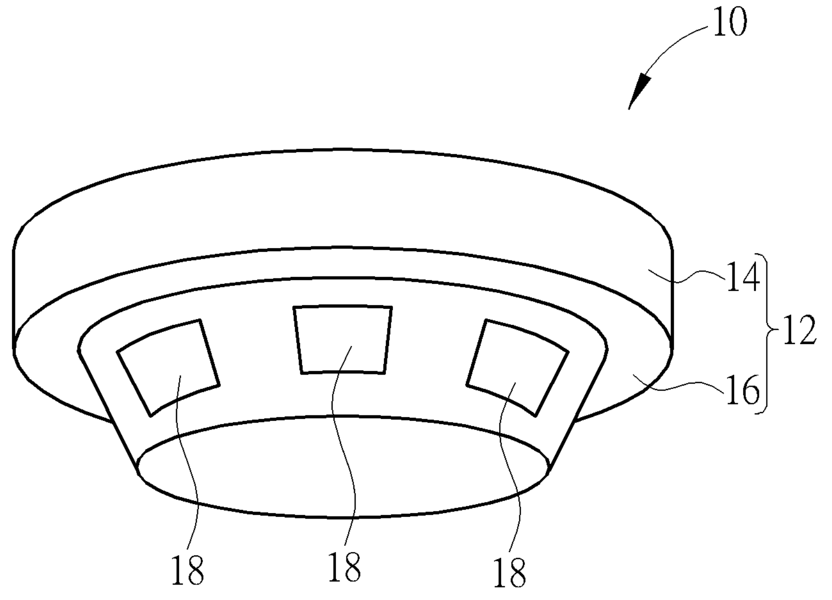
FIG. 1 is a diagram of a smoke detection device according to an embodiment of the present invention.

Please refer to FIG. 1. FIG. 1 is a diagram of a smoke detection device 10 according to an embodiment of the present invention. A housing 12 of the smoke detection device 10 can include a first section 14 and a second section 16. A plurality of detectors of the smoke detection device 10 can be disposed on the first section 14. A piercing hole 18 can be formed on the second section 16. The smoke detection device 10 can be disposed on the ceiling in a room. If a fire accident happened, smoke flows into the housing 12 through the piercing hole 18, and the detector of the smoke detection device 10 can output alarm when smoke concentration exceeds a predefined threshold. For preventing detection accuracy of the smoke detection device 10 from being decreased due to the elevated temperature smoke detection device 10 resulted from the smoke accumulated in the housing 12, the present invention provide several structural design contributive to smoothly exhaust the smoke inside the housing 12.

Figure 2:
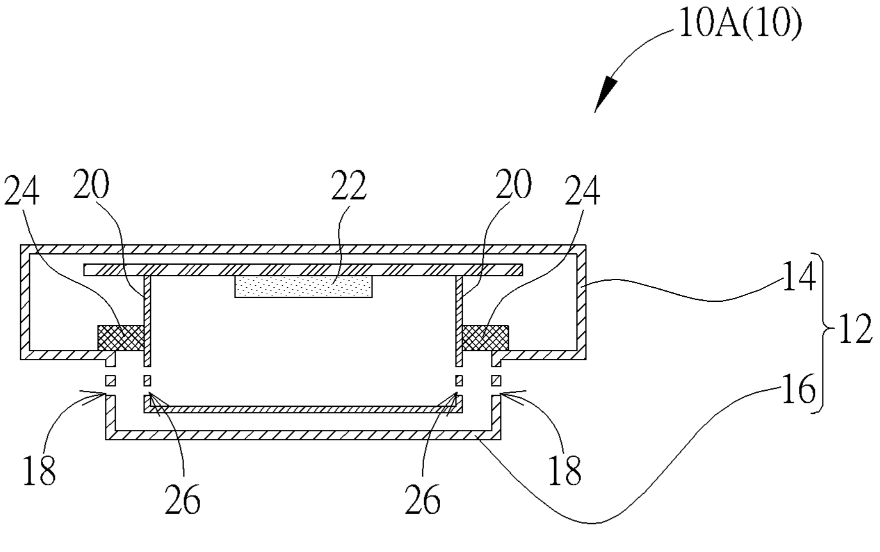
FIG. 2 is a sectional view of the smoke detection device according to a first embodiment of the present invention.

Please refer to FIG. 2. FIG. 2 is a sectional view of the smoke detection device 10A according to a first embodiment of the present invention. The smoke detection device 10A can include a smoke collector 20, an optical detector 22 and a cover plate 24. The smoke collector 20 can be disposed on the first section 14 of the housing 12, and a part of the smoke collector 20 can be stretched into the second section 16. The smoke collector 20 can include a smoke hole 26 formed on a wall of the smoke collector 20 stretched into the second section 16. Position of the smoke hole 26 can be adjacent to position of the piercing hole 18. The optical detector 22 can be disposed on a circuit board (which is not illustrated in the figures) and located inside the smoke collector 20. The optical detector 22 can detect gaseous concentration within the smoke collector 20. The optical detector 22 can emit an optical detection signal, and receive an optical reflection signal generated from gaseous matter projected by the optical detection signal, and determine whether the gaseous concentration exceeds the predefined threshold in accordance with parameter difference between the optical detection signal and the optical reflection signal. Application of the optical detector 22 is not limited to the foresaid embodiment, and depends on an actual demand.

The gaseous matter can flow into the housing 12 through the piercing hole 18, and then flow into the smoke collector 20 through the smoke hole 26. Therefore, the smoke detection device 10A of the first embodiment can dispose the cover plate 24 between the housing 12 and the smoke collector 20. The cover plate 24 can be optionally located on a boundary between the first section 14 and the second section 16, so as to prevent the gaseous matter into the housing 12 from flowing from the second section 16 into the first section 14, and ensure the gaseous matter can completely flow into the smoke collector 20 through the smoke hole 26. Generally, two opposite ends of the cover plate 24 can be respectively attached to the housing 12 and the smoke collector 20 via adhesive. The present invention can further seal a gap between the housing 12 and the smoke collector 20 in an embedding, engaging, locking or any possible manner.

As shown in FIG. 2, the smoke detection device 10A can form several piercing holes 18 respectively on opposite sides of the housing 12, such as the right side and the left side, or the front side and the rear side. All sides of the smoke collector 20 can have several smoke holes 26. A number of the cover plate 24 can correspond to numbers of the piercing hole 18 and the smoke hole 26. The cover plate 24 can be used to seal the gap between the housing 12 and the smoke collector 20, and establish one channel from the piercing hole 18 to the smoke hole 26 and another channel from the smoke hole 26 to the piercing hole 18. As the embodiment shown in FIG. 2, the gaseous matter can flow into the housing 12 through the left-side piercing hole 18, and flow into the smoke collector 20 through the left-side smoke hole 26; then, the gaseous matter can flow out of the smoke collector 20 through the right-side smoke hole 26, and then flow out of the housing 12 through the right-side piercing hole 18. The first embodiment can avoid the smoke from accumulating in the first section 14 of the housing 12, so as to cool down the whole temperature of the smoke detection device 10A.

Figure 3:
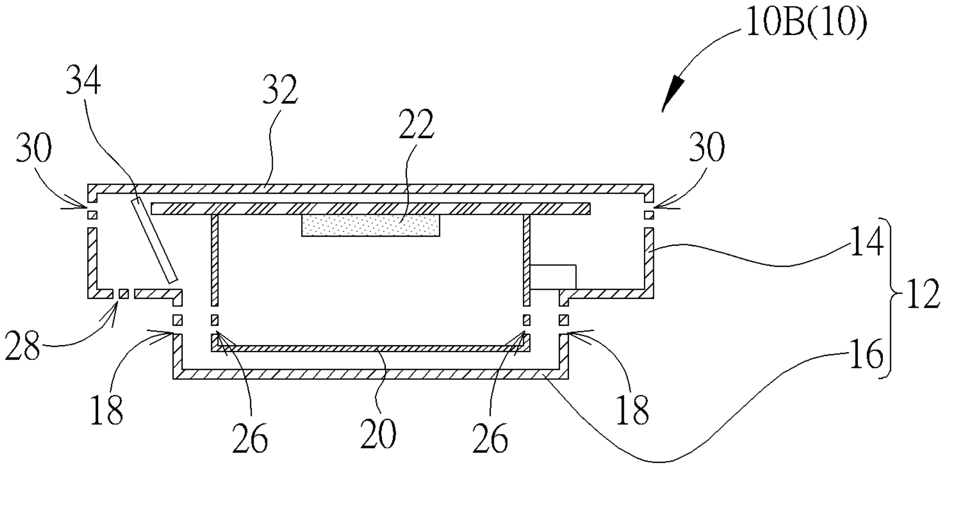
FIG. 3 is a sectional view of the smoke detection device according to a second embodiment of the present invention.

Please refer to FIG. 3. FIG. 3 is a sectional view of the smoke detection device 10B according to a second embodiment of the present invention. In the second embodiment, elements having the same numerals as ones of the first embodiment have the same structures and functions, and a detailed description is omitted herein for simplicity. The housing 12 of the smoke detection device 10B can have the piercing hole 18, an installation hole 28 and an exhausting hole 30. The installation hole 28 can be formed on the first section 14, and used to install a testing button or be an alarm hole or any possible application. The smoke detection device 10B can be attached to the ceiling via an attached surface 32 of the housing 12. The exhausting hole 30 can be adjacent to the attached surface 32 of the housing 12, which means the exhausting hole 30 can be disposed on the first section 14. The smoke detection device 10B can optionally dispose a guiding element 34 inside the housing 12. The guiding element 34 can be located between the installation hole 28 and the exhausting hole 30, and used to establish the channel from the installation hole 28 to the exhausting hole 30.

In the second embodiment, the gaseous matter can flow into the smoke detection device 10B through at least one of the piercing hole 18 and the installation hole 28 formed on the housing 12. A part of the gaseous matter into the piercing hole 18 can flow into the smoke collector 20 through the smoke hole 26, and other part of the gaseous matter into the piercing hole 18 may flow from the second section 16 into the first section 14 of the housing 12. The gaseous matter flowing into the installation hole 28 may stay inside the first section 14 of the housing 12. Therefore, the smoke detection device 10B can form the exhausting hole 30 on the housing 12 to exhaust the gaseous matter accumulated inside the housing 12. The gaseous matter can smoothly flow toward the exhausting hole 30 and leave the housing 12 via the guiding element 34. As shown in FIG. 2, the guiding element 34 can be a plate-type structure; however, the guiding element 34 can further be a wave-type structure, a curved-type structure, a tube-type structure or any structures capable of guiding the airflow.

Figure 4:
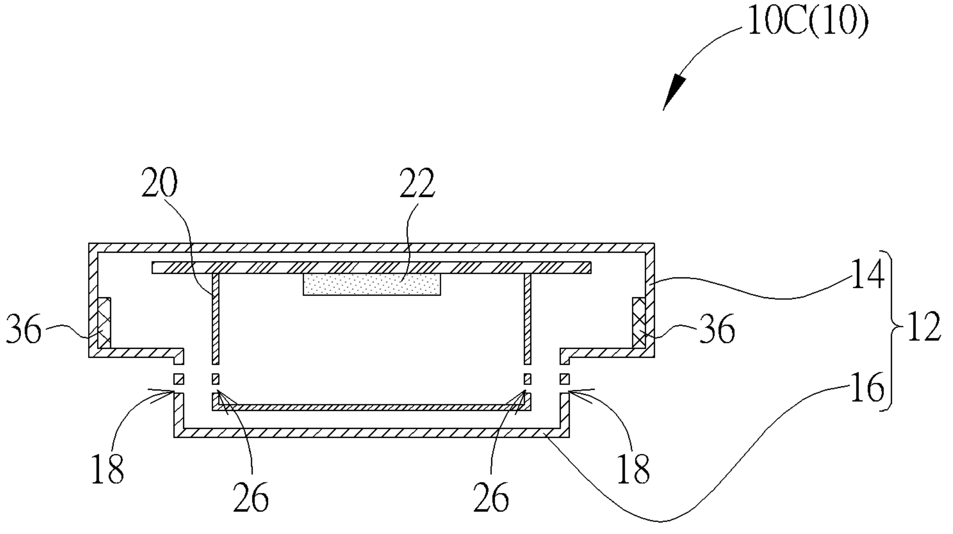
FIG. 4 is a sectional view of the smoke detection device according to a third embodiment of the present invention.

Please refer to FIG. 4. FIG. 4 is a sectional view of the smoke detection device 10C according to a third embodiment of the present invention. In the third embodiment, elements having the same numerals as ones of the first embodiment have the same structures and functions, and a detailed description is omitted herein for simplicity. The smoke detection device 10C can optionally include a heat dissipation element 36 disposed inside the housing 12 and used to absorb heat transmitted into the housing 12 when the gaseous matter flows through the piercing hole 18 and the smoke hole 26. The heat dissipation element 36 can be made by high thermal conductivity material. Generally, the heat dissipation element 36 can be disposed on the first section 14 of the housing 12 to dissipate the heat from the gaseous matter accumulated inside the housing 12, so as to cool down the temperature of the smoke detection device 10C. Location of the heat dissipation element 36 is not limited to the foresaid embodiment; for example, the heat dissipation element 36 may be bent and distributed over the first section 14 and the second section 16 of the housing 12.

The heat dissipation element 36 can be preferably disposed on a lateral wall of the housing 12. The heat dissipation element 36 can absorb and dissipate the heat of the gaseous matter inside the housing 12 via the lateral wall of the housing 12, so as to rapidly cool down the temperature of the smoke detection device 10C. The high-temperature gaseous matter is accumulated on top of the first section 14, so that the heat dissipation element 36 can further be disposed on an inner top surface of the housing 12 and stretched to the lateral wall of the housing 12; the heat of the gaseous matter accumulated inside the housing 12 can be rapidly dissipated accordingly. A shape and position of the heat dissipation element 36 are not limited to the foresaid embodiment, which depends on the design demand, and a detailed description is omitted herein for simplicity.

Figure 5:
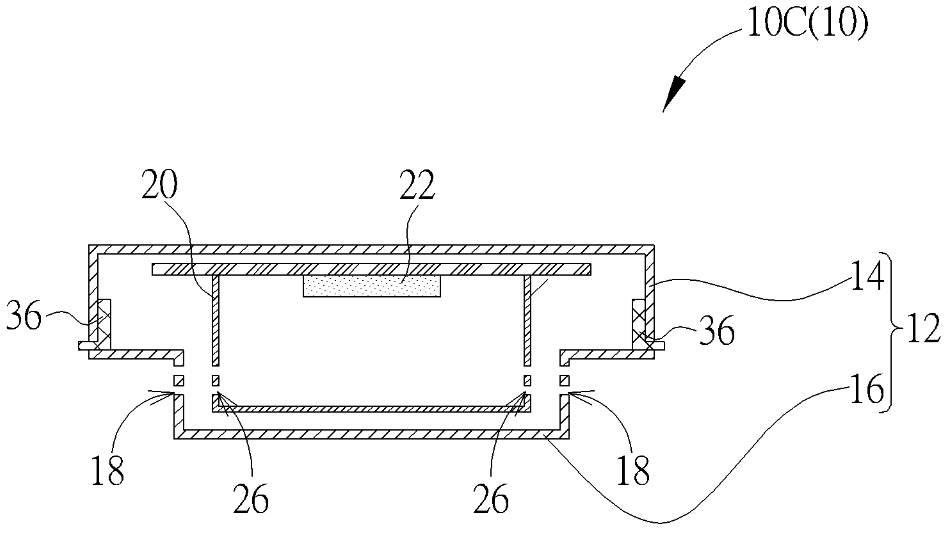
FIG. 5 is a sectional view of the smoke detection device in another type according to the third embodiment of the present invention.

Please refer to FIG. 5. FIG. 5 is a sectional view of the smoke detection device 10C in another type according to the third embodiment of the present invention. In the embodiment shown in FIG. 4, the heat dissipation element 36 is disposed inside the housing 12, and used to absorb the heat of the gaseous matter accumulated inside the housing 12, so as to cool down the temperature of the smoke detection device 10C by high thermal conductivity of the heat dissipation element 36. In the embodiment shown in FIG. 5, a part of the heat dissipation element 36 can be stretched out of the housing 12, and the heat of the gaseous matter accumulated inside the housing 12 can be rapidly dissipated out of the smoke detection device 10C via the heat dissipation element 36. As shown in FIG. 4 and FIG. 5, the heat dissipation element 36 can be attached to the inner lateral wall of the housing 12; however, the heat dissipation element 36 may be optionally attached to other wall of the housing 12, or may be erected inside the housing 12.

Figure 6:
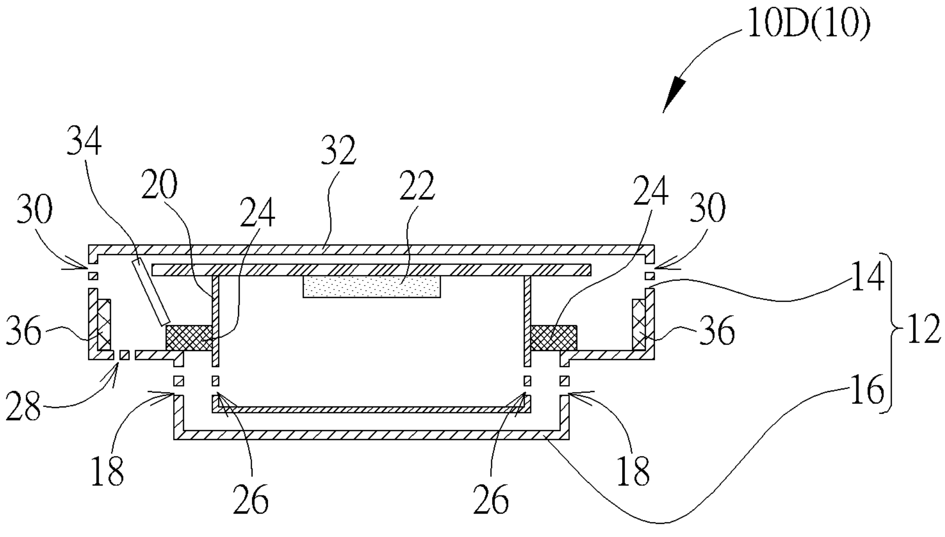
FIG. 6 is a sectional view of the smoke detection device according to a fourth embodiment of the present invention.

Please refer to FIG. 6. FIG. 6 is a sectional view of the smoke detection device 10D according to a fourth embodiment of the present invention. The first embodiment can utilize the cover plate 24 to establish the channel of guiding the gaseous matter into the smoke collector 20. The second embodiment can form the exhausting hole 30 on the housing 12 for exhausting the gaseous matter accumulated inside the housing 12. The third embodiment can dispose the heat dissipation element 36 inside the housing 12 to absorb the heat transmitted into the housing 12 by the gaseous matter for effective dissipation. The fourth embodiment can integrate the above-mentioned embodiments; in the fourth embodiment, the cover plate 24 can be set to seal the gap between the housing 12 and the smoke collector 20 for preventing the gaseous matter from flowing from the second section 16 into the first section 14 of the housing 12, and the exhausting hole 30 can be formed on the housing 12 to exhaust the gaseous matter leaked into the housing 12 through at least one of the piercing hole 18 and the installation hole 28, and the heat dissipation element 36 can be disposed inside the housing 12 to absorb and dissipate the heat accumulated in the smoke detection device 10D and further can be cooperated with or replaced by the guiding element 34 for rapidly flowing the gaseous matter out of the exhausting hole 30. In other possible embodiment, the guiding element 34 may be optionally made by high thermal conductivity material for cooperating or replacing the heat dissipation element 36.

In conclusion, the gaseous concentration passing through the smoke detection device is affected by the temperature of the smoke detection device. If the smoke detection device has high temperature, the gaseous concentration flowing around the smoke detection device is lowered, and the alarm of the smoke detection device is triggered until the gaseous concentration exceeds a higher threshold; the smoke detection device may not immediately output the alarm if the gaseous matter is fire smoke. Therefore, the present invention can optionally apply one or some of the cover plate, the exhausting hole, the guiding element and the heat dissipation element for the smoke detection device, so as to effectively cool down the temperature of the smoke detection device and increase the detection accuracy of the smoke detection device.

Figure 7:
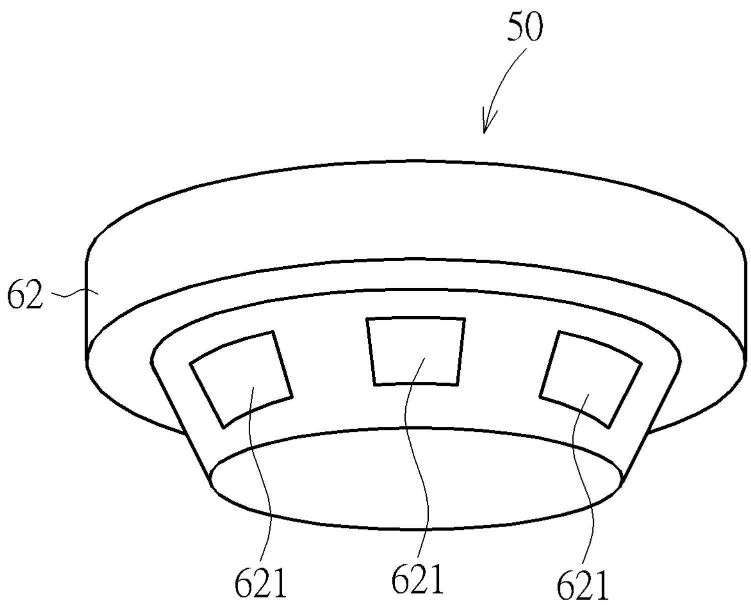
FIG. 7 is a diagram of the smoke detection device according to another embodiment of the present invention.
Figure 8:
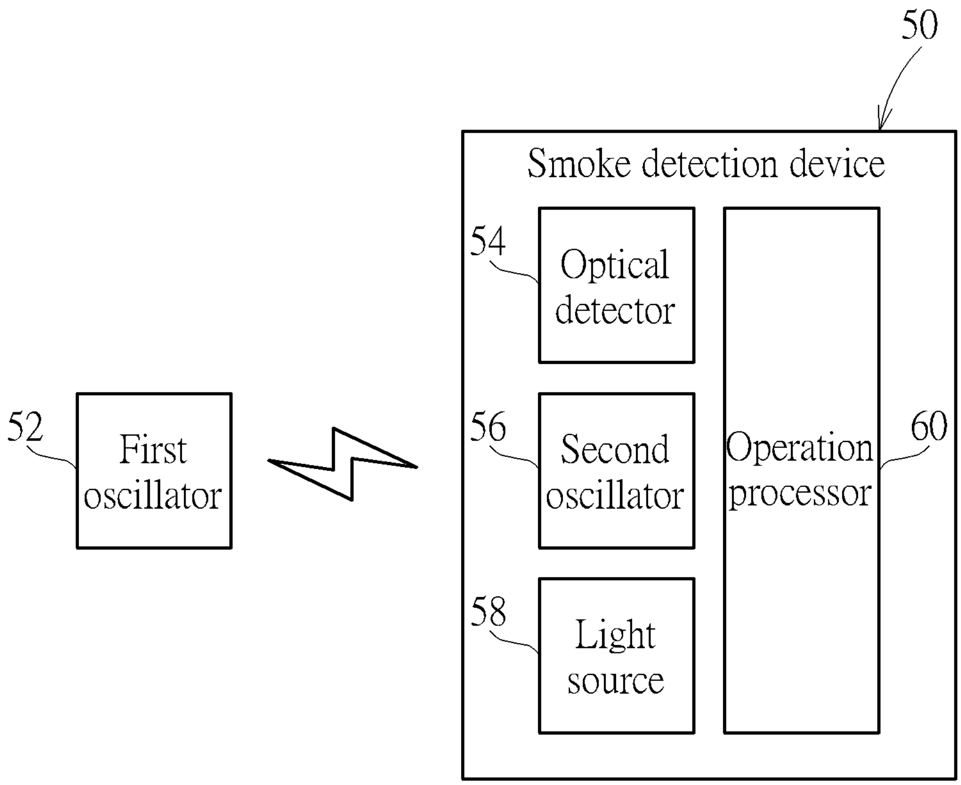
FIG. 8 is a functional block diagram of the smoke detection device according to the foresaid embodiment of the present invention.
Figure 9:
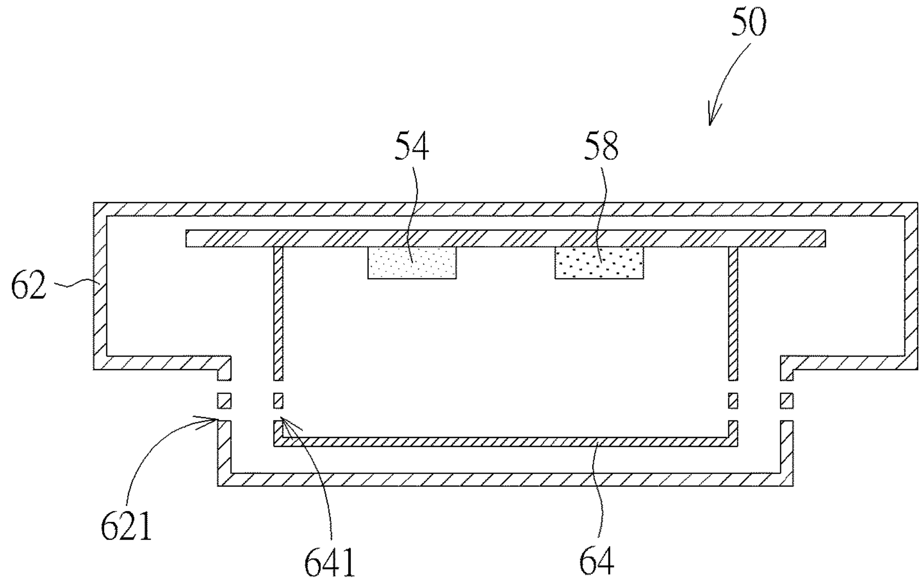
FIG. 9 is a sectional view of the smoke detection device according to the foresaid embodiment of the present invention.

Please refer to FIG. 7 to FIG. 9. FIG. 7 is a diagram of the smoke detection device 50 according to another embodiment of the present invention. FIG. 8 is a functional block diagram of the smoke detection device 50 according to the foresaid embodiment of the present invention. FIG. 9 is a sectional view of the smoke detection device 50 according to the foresaid embodiment of the present invention. The smoke detection device 50 can detect environmental temperature to accordingly calibrate a detection value of smoke concentration inside or around the smoke detection device 50. The smoke detection device 50 can be cooperated with a first oscillator 52 with a first oscillation parameter for increasing the detection accuracy of the smoke concentration. The smoke detection device 50 can include an optical detector 54, a second oscillator 56, a light source 58 and an operation processor 60 electrically connected to each other. The second oscillator 56 and the operation processor 60 can be disposed inside a housing 62 of the smoke detection device 50. The optical detector 54 and the light source 58 can be disposed inside a smoke collector 64 of the housing 62. Gaseous matter outside the smoke detection device 50 can flow into the housing 62 through a piercing hole 621, and then flow into the smoke collector 64 through a smoke hole 641.

The light source 58 can emit the optical detection signal. The optical detection signal is projected onto smoke inside the smoke collector 64 to generate the optical reflection signal. The optical detector 54 can receive the optical reflection signal, and analyze parameter difference between the optical detection signal and the optical reflection signal to determine whether the smoke concentration within the smoke collector 64 exceeds a threshold. Application of the optical detector 54 is not limited to the above-mentioned embodiment. The second oscillator 56 can have a second oscillation parameter used to drive the optical detector 54 and the light source 58. A quantity of the optical signal acquired by the optical detector 54 and an actuation period of the light source 58 can be varied in accordance with the second oscillation parameter of the second oscillator 56. The second oscillator 56 can be a resistance capacitance (RC) oscillator, which is cheaper than the first oscillator 52, and the second oscillation parameter of the second oscillator 56 is easily affected by the environmental temperature. The detection accuracy of the smoke concentration acquired by the optical detector 54 may be faulted when the environmental temperature is varied widely.

In the present invention, the first oscillator 52 can be a quartz oscillator, which is expensive and has the stable first oscillation parameter not affected or slightly affected by the environmental temperature. The smoke detection device 50 can be applied for the first oscillator 52 with the first oscillation parameter. A first variation range of the first oscillation parameter changed by the environmental temperature around the smoke detection device 50 can be smaller than a second variation range of the second oscillation parameter changed by the environmental temperature around the smoke detection device 50. The operation processor 60 can analyze parameter difference between the first oscillation parameter and the second oscillation parameter, and calibrate a detection result of the smoke concentration acquired by the optical detector 54 in accordance with an analysis result, or further estimate the environmental temperature around the smoke detection device 50 in accordance with the analysis result. The foresaid oscillation parameter can be an oscillation frequency of the oscillator, or can be defined as any possible parameters of the oscillator.

Figure 10:
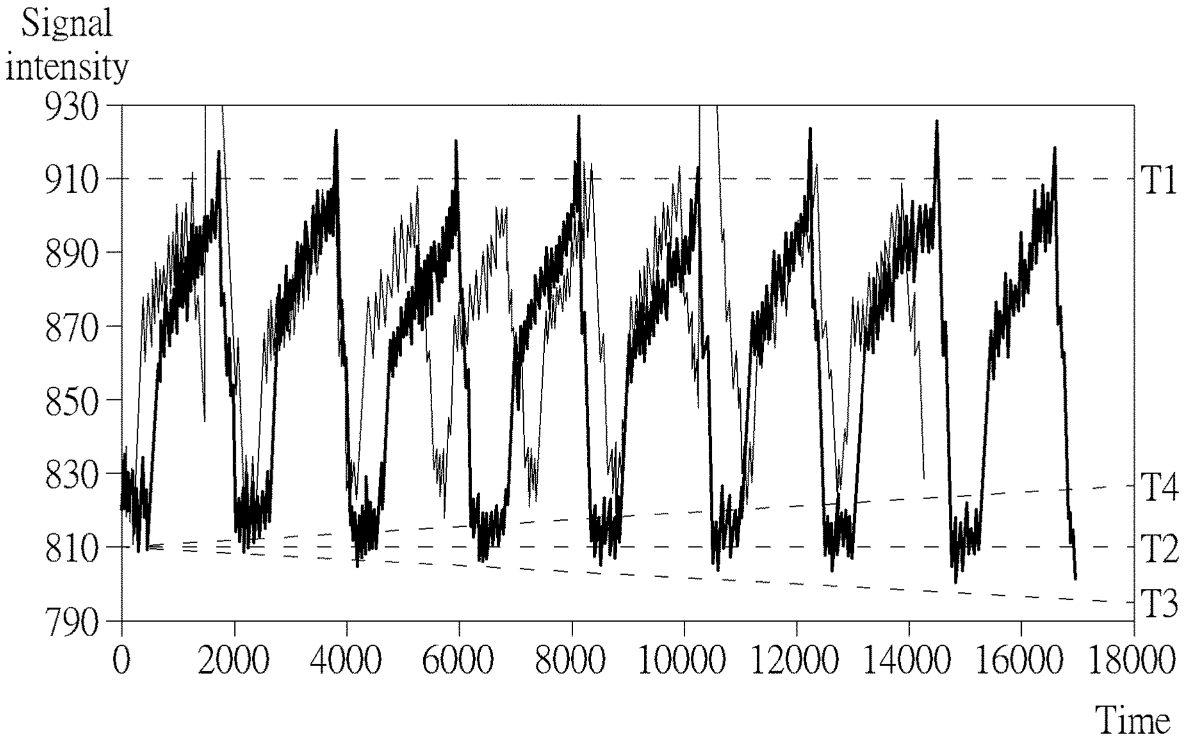
FIG. 10 is a diagram of an optical reflection signal received by an optical detector varied with time according to the foresaid embodiment of the present invention.

Please refer to FIG. 10. FIG. 10 is a diagram of the optical reflection signal received by the optical detector 54 varied with time according to the foresaid embodiment of the present invention. The smoke detection device 50 can form a plurality of piercing holes 621 respectively on a plurality of lateral surfaces of the housing 62. For example, the smoke detection device 50 can form eight piercing holes 621 respectively on eight lateral surfaces of the housing 62. In the testing procedure, the smoke detection device 50 can be rotated to sequentially face the eight lateral surfaces toward the smoke. As shown in FIG. 10, eight curves can be interpreted as intensity variation of the optical signal received by the optical detector 54 in response to the eight piercing holes 621 respectively facing the smoke.

If the environmental temperature is kept in a normal temperature range, the second oscillation parameter can stay in a predefined range, which means the parameter difference between the first oscillation parameter and the second oscillation parameter conforms to the predefined range, and the intensity variation of the optical reflection signal acquired by the optical detector 54 can be set between a threshold T1 and a threshold T2. If the smoke concentration around the smoke detection device 50 is raised, difference between a maximal value and a minimal value of the optical reflection signal can be greater than the difference between the threshold T1 and the threshold T2, and the smoke detection device 50 can output the alarm to remind the fire accident happened. The normal temperature range of the environmental temperature and the predefined range of the second oscillation parameter can depend on the design demand, and actual values of the said ranges are omitted herein for simplicity.

If the environmental temperature around the smoke detection device 50 is raised, the second oscillation parameter can be increased accordingly, and an exposure period of the optical detector 54 driven by the second oscillator 56 can be shortened. The intensity of the optical reflection signal received by the optical detector 54 is weakened, and the smoke detection device 50 outputs the alarm only if the difference between the maximal value and the minimal value of the optical reflection signal is greater than the difference between the threshold T1 and the threshold T3; that is to say, accumulated quantity of the smoke concentration capable of triggering the smoke detection device 50 is changed and increased, so that the smoke detection device 50 cannot immediately output the alarm. The first oscillation parameter is not changed in accordance with the raised environmental temperature, or variation of the first oscillation parameter changed in accordance with the raised environmental temperature is smaller than variation of the second oscillation parameter changed in accordance with the same temperature difference, so that the operation processor 60 can compute the parameter difference between the first oscillation parameter and the second oscillation parameter, and reduce signal difference between the maximal value and the minimal value of the optical reflection signal when the parameter difference exceeds the predefined range.

For example, the threshold T1 may be 910 lux, and the threshold T2 may be 810 lux, and the threshold T3 may be 800 lux. When the environmental temperature is kept in the normal temperature range, the smoke detection device 50 can output the alarm in response to the intensity variation of the optical reflection signal which is affected by the smoke concentration reaching 100 lux (the difference between the threshold T1 and the threshold T2). When the environmental temperature is raised, the smoke detection device 50 can output the alarm in response to the intensity variation of the optical reflection signal which is affected by the smoke concentration reaching 110 lux (the difference between the threshold T1 and the threshold T3). Therefore, the operation processor 60 can calibrate the signal intensity of the optical reflection signal if determining the parameter difference between the first oscillation parameter and the second oscillation parameter is greater than the predefined range, and then drive the smoke detection device 50 to output the alarm in response to the intensity variation of the optical reflection signal reaching 100 lux.

If the environmental temperature around the smoke detection device 50 is dropped, the second oscillation parameter is decreased accordingly, and the exposure period of the optical detector 54 driven by the second oscillator 56 can be lengthened. The signal intensity of the optical reflection signal received by the optical detector 54 is strengthened, and the smoke detection device 50 outputs the alarm only if the difference between the maximal value and the minimal value of the optical reflection signal is greater than a range between the threshold T1 and a threshold T4. For example, the threshold T4 may be 830 lux. When the environmental temperature is dropped, the smoke detection device 50 can output the alarm in response to the intensity variation of the optical reflection signal which is affected by the smoke concentration reaching 80 lux (the difference between the threshold T1 and the threshold T4); however, the smoke detection device 50 is preset to output the alarm when the intensity variation reaches 100 lux. When the operation processor 60 determines the parameter difference between the first oscillation parameter and the second oscillation parameter is smaller than the predefined range, the smoke detection device 50 does not output the alarm in response to the maximal value of the optical reflection signal reaches the threshold T1, but can output the alarm in response to the maximal value of the optical reflection signal exceeding the threshold T1 and signal difference between the maximal value and the minimal value of the optical reflection signal reaching 100 lux.

In conclusion, the present invention can acquire the environmental temperature without additional temperature sensor, and can effectively decrease hardware cost and systematic complexity of the smoke detection device; the increased second oscillation parameter can represent the environmental temperature is raised, and the decreased second oscillation parameter can represent the environmental temperature is dropped, so that the parameter difference between the first oscillation parameter and the second oscillation parameter can be analyzed to estimate the actual environmental temperature around the smoke detection device. The present invention can analyze information of the environmental temperature to determine that the intensity variation of the optical reflection signal received by the optical detector is resulted from the fire smoke or other interference. Besides, the present invention can utilize the external first oscillator to calibrate a detection error of the second oscillator affected by the changed environmental temperature. The first oscillator can be a variety of oscillators. The oscillator that has the oscillation parameter varied smaller than variation of the oscillation parameter of the second oscillator inside the smoke detection device in accordance with temperature change can conform to a scope of the first oscillator in the present invention. The smoke detection device of the present invention can compute the parameter difference between the first oscillation parameter and the second oscillation parameter, and adjust a comparison result between the intensity variation of the optical reflection signal and the threshold in accordance with the parameter difference, so as to avoid the smoke detection device from early outputting the alarm in response to the low smoke concentration, or to avoid the smoke detection device from delaying the alarm in response to the high smoke concentration.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smoke detection device comprising:

a housing having a piercing hole;

a smoke collector having a smoke hole, position of the smoke hole being close to position of the piercing hole;

an optical detector disposed inside the smoke collector and adapted to detect gaseous concentration inside the smoke collector; and a cover plate disposed between the housing and the smoke collector, and adapted to establish a channel from the piercing hole to the smoke hole, so that gaseous matter flows from outside the smoke detection device into the smoke collector through the piercing hole and the smoke hole;

wherein the housing comprises a first section and a second section, the piercing hole is formed on the second section, and the cover plate is disposed on a boundary set between the first section and the second section.

2. The smoke detection device of claim 1, wherein the smoke collector is disposed inside the first section and partly stretched into the second section, the smoke hole is formed on a wall of the smoke collector stretched into the second section.

3. The smoke detection device of claim 1, wherein a gap between the housing and the smoke collector is sealed by the cover plate, so as to prevent the gaseous matter entering the piercing hole from flowing from the second section to the first section.

4. The smoke detection device of claim 3, wherein two opposite ends of the cover plate are respectively attached to the housing and the smoke collector via adhesive.

5. The smoke detection device of claim 1, wherein an installation hole and an exhausting hole are formed on the first section, the exhausting hole is adjacent to an attached surface of the housing, and the attached surface is an outer surface of the smoke detection device contacting a ceiling.

6. The smoke detection device of claim 5, wherein the housing further has a guiding element disposed between the installation hole and the exhausting hole, and adapted to guide the gaseous matter entering the installation hole to exhaust out of the housing through the exhausting hole.

7. The smoke detection device of claim 1, wherein the housing further has a heat dissipation element disposed inside the first section and adapted to absorb heat transmitted into the housing by the gaseous matter.

8. The smoke detection device of claim 7, wherein the heat dissipation element is disposed inside the housing, or a part of the heat dissipation element is stuck out of the housing for heat dissipation.

9. A smoke detection device comprising:

a housing having a piercing hole, an installation hole and an exhausting hole, the exhausting hole being adjacent to an attached surface of the housing, and the attached surface being an outer surface of the smoke detection device contacting a ceiling;

a smoke collector having a smoke hole, position of the smoke hole being close to position of the piercing hole;

an optical detector disposed inside the smoke collector and adapted to detect gaseous concentration inside the smoke collector;

wherein gaseous matter flowing into the housing through at least one of the piercing hole and the installation hole but not entering the smoke collector through the smoke hole is exhausted out of the housing via the exhausting hole; and wherein the housing comprises a first section and a second section, the installation hole and are exhausting hole are formed on the first section, the piercing hole is formed on the second section.

10. The smoke detection device of claim 9, wherein the housing further has a guiding element disposed between the installation hole and the exhausting hole, and adapted to establish a channel from the installation hole to the exhausting hole, the guiding element is made by thermal conductivity material adapted to absorb heat transmitted into the housing by the gaseous matter.

11. The smoke detection device of claim 10, wherein the guiding element is disposed inside the housing, or a part of the heat dissipation element is stuck out of the housing for heat dissipation.

12. A smoke detection device comprising:

a housing having a piercing hole;

a smoke collector having a smoke hole, position of the smoke hole being close to position of the piercing hole;

an optical detector disposed inside the smoke collector and adapted to detect gaseous concentration inside the smoke collector; and a heat dissipation element disposed inside the housing and adapted to absorb heat transmitted into the housing by the gaseous matter flowing through the piercing hole and the smoke hole;

wherein the heat dissipation element is disposed inside the housing, or a part of the heat dissipation element is stuck out of the housing for heat dissipation.

13. The smoke detection device of claim 12, wherein the housing comprises a first section and a second section, the smoke collector is disposed inside the first section and partly stretched into the second section, the heat dissipation element is disposed on the first section, and the piercing hole is formed on the second section.

* * * * *